E. J. ARMSTRONG.
STEAM SHOVEL AND THE LIKE.
APPLICATION FILED DEC. 6, 1916.

1,258,974. Patented Mar. 12, 1918.

Inventor
Edwin J. Armstrong
By
Attorney

UNITED STATES PATENT OFFICE.

EDWIN J. ARMSTRONG, OF ERIE, PENNSYLVANIA, ASSIGNOR TO BALL ENGINE COMPANY, OF ERIE, PENNSYLVANIA, A CORPORATION OF PENNSYLVANIA.

STEAM-SHOVEL AND THE LIKE.

1,258,974.  Specification of Letters Patent.  Patented Mar. 12, 1918.

Application filed December 6, 1916. Serial No. 135,329.

*To all whom it may concern:*

Be it known that I, EDWIN J. ARMSTRONG, a citizen of the United States, residing at Erie, in the county of Erie and State of Pennsylvania, have invented new and useful Improvements in Steam-Shovels and the like, of which the following is a specification.

This invention relates to steam shovels and the like and consists in certain improvements in the construction thereof as will be hereinafter fully described and pointed out in the claims.

Machines of this type are provided with a frame on which is mounted a swinging platform. The power mechanism of the machine is mounted on this swinging platform. In moving the machine from one place to another it is operated through its traction. The hoisting engine which is used in the normal operation of the machine for hoisting the shovel or clam shell, as the case may be, is utilized for driving the machine. It is desirable to have the machine driven at different speeds. Different methods have been employed for affording differences in gear ratio to accomplish this purpose. The object of the present invention is to simplify this mechanism.

The invention is illustrated in the accompanying drawings as follows:—

Figure 1:
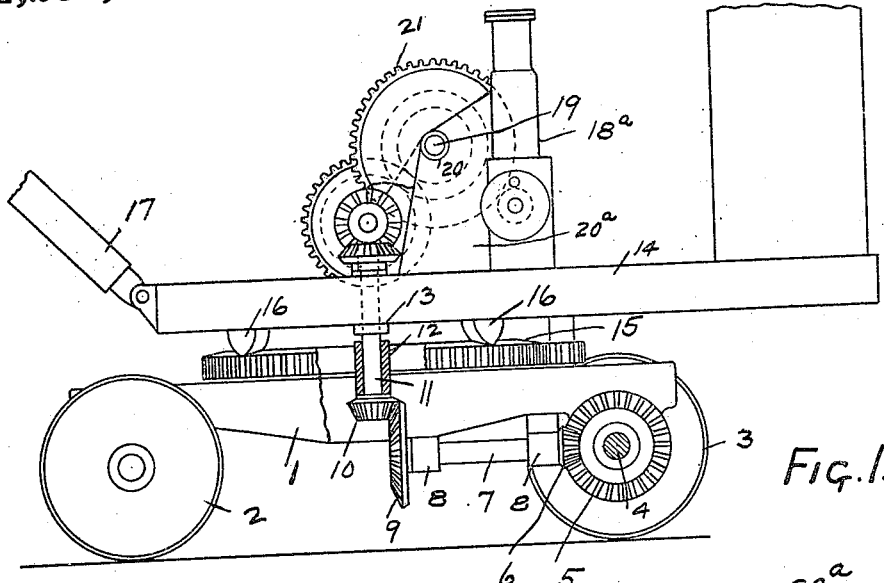

Figure 1 shows a side elevation of the machine, partly in section.

Figures 2, 3:
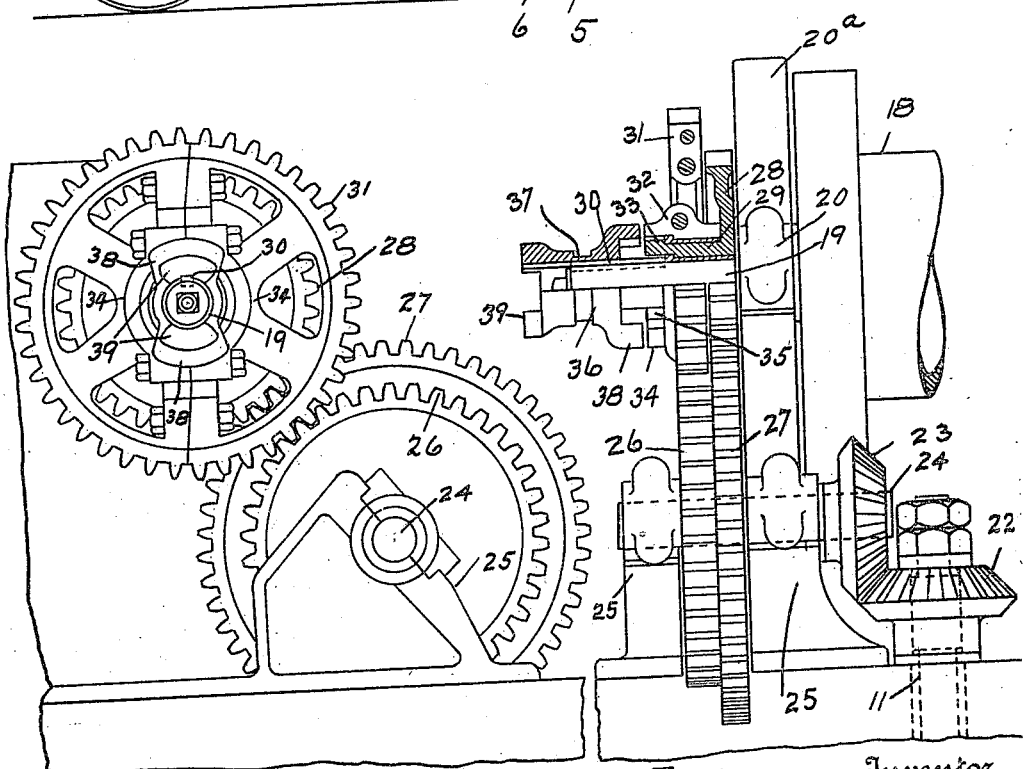

Fig. 2 an enlarged end view of the speed changing gears.

Fig. 3 a front view of the same gears with adjacent parts.

1 marks the frame of the machine, 2 a front wheel, and 3 a rear wheel which is ordinarily used as a traction wheel. The rear wheel is mounted on the axle 4, the axle 4 being journaled in the frame 1 by bearings (not shown). A gear 5 is fixed on the axle 4. A gear 6 meshes the gear 5. The gear 6 is fixed on the shaft 7. The shaft 7 is carried in the bearings 8. A gear 9 is fixed on the shaft 7 and meshes a gear 10. The gear 10 is fixed on the lower end of a center pin 11. The center pin 11 is journaled in bearings 12 in the frame and a center bearing 13 in the swinging platform 14. The swinging platform is mounted on the track 15, wheels 16 being provided for this purpose. The usual boom 17 is secured to the swinging platform. These parts may be of ordinary construction.

The hoisting drum 18 is preferably set near the center of the platform in order that the cable running therefrom may be in line with the boom. This is mounted on a drum shaft 19 which is carried in bearings 20 in the frame 20ª. The drum is driven by a gear 21 fixed on the shaft 19 and from an engine 18ª.

A gear 22 is fixed on the upper end of the pin 11. It meshes a gear 23. The gear 23 is fixed on the shaft 24. A cross shaft 24 is mounted in the bearings 25 carried by the platform. Gears 26 and 27 are fixed on the cross shaft 24. A gear 27 meshes a gear 28. This gear is journaled on the drum shaft 19 and has an extended hub 29. The gear is held in place by the spline 30 which is fixed in the shaft 19. A split gear 31 has a hub 32 which is journaled on the hub 29. The hub 29 has a shoulder 33 which holds the gear 31 in place on the hub 29. The gear 31 meshes the gear 26. The gears 26 and 27 are of different diameters and the gears 28 and 31 are of diameters to mesh the gears 26 and 27. It will be readily seen, therefore, that if a driving connection is established between the gears 28 and 27 that a slower speed will be given to the shaft 24 and consequently to the machine than as if the driving connection were through the gears 31 and 26, the gear 31 being of a larger diameter than the gear 28 and the gear 28 of a smaller diameter than the gear 27.

In order to lock either the gear 31 or 28 with the drum shaft, I have provided the following mechanism: The gear 31 is provided with a clutch face 34 and the gear 28 with a clutch face 35. A clutch member 36 is slidingly mounted on the shaft 28 having a groove operating with the spline 30 to lock the clutch member against rotation on the shaft. The clutch member 36 has a groove 37 to which proper mechanism for operating this part may be attached. One end 38 of the clutch member is adapted to engage the clutch face 34 and when this end is used the driving connection will be through the gear 31, the clutch member 36 through the end 38 locking the clutch member 34 and hence the gear 31 with the shaft. When it is desired to drive through the gear 28 the clutch member 36 is detached from the shaft 19 and its ends reversed. The clutch face 39 will then engage the clutch face 35 and thus lock the gear 28 with the shaft.

In devices of this type where the operating mechanism is mounted on the platform the proper distribution of the weight and the placing of the necessary machinery thereon is a matter of great consideration. On the other hand it is much more desirable to have the speed changing device above the platform on which the operator stands so that it can be more conveniently operated than at points below the frame as has heretofore been done. The foregoing mechanism accomplishes this in a convenient and efficient way and is so arranged with relation to the hoisting drum as to clear its cable and in such position so as to in no way discommode the operator in the control of the machine.

What I claim as new is:—

1. In a machine of the class described, the combination of a traction wheel; a frame mounted on the traction wheel; a swinging platform on the frame; a center pin; bearings for said pin in said frame and platform; a driving connection between the pin and wheel; a hoisting drum on the platform; a drum shaft for the drum; a cross shaft; a driving connection between the cross shaft and the pin; gears of different diameters on the cross shaft; gears of different diameters on the drum shaft; and means for forming a driving connection between said shafts through either set of gears.

2. In a machine of the class described, the combination of a traction wheel; a frame mounted on the traction wheel; a swinging platform on the frame; a center pin; bearings for said pin in said frame and platform; a driving connection between the pin and wheel; a hoisting drum on the platform; a drum shaft for said drum; a driving gear for the drum; a cross shaft; a driving connection between the cross shaft and the pin; cross shaft gears of different diameters on the cross shaft; drum shaft gears of different diameters on the drum shaft, said drum shaft gears being at the opposite side of the drum from the driving gear; and means for forming a driving connection between said shafts through either set of drum shaft and cross shaft gears.

3. In a machine of the class described, the combination of a traction wheel; a frame mounted on the traction wheel; a swinging platform on the frame; a center pin; bearings for said pin in said frame and platform; a driving connection between the pin and wheel; a drive shaft mounted on the platform; a cross shaft; a driving connection between the cross shaft and the pin; gears of different diameters on the cross shaft; gears of different diameters on the drive shaft; and means for forming a driving connection between said shafts through either set of gears.

4. In a machine of the class described, the combination of a traction wheel; a frame mounted on the traction wheel; a swinging platform on the frame; a center pin; bearings for said pin in said frame and platform; a driving connection between the pin and wheel; a drive shaft mounted on the platform; a cross shaft mounted on the platform; a driving connection between the cross shaft and pin; adjacent gears of different diameters mounted on the cross shaft; adjacent gears of different diameters mounted on the drum shaft, one pair of said adjacent gears being free to rotate on the shaft on which it is mounted and each gear having clutch faces thereon; and a clutch member slidingly and detachably mounted on the same shaft, one end of the clutch member being adapted to engage the clutch face of one gear and the other end of the clutch member being adapted to engage the clutch face of the other gear.

5. In a machine of the class described, the combination of a traction wheel; a frame mounted on the traction wheel; a swinging platform on the frame; a center pin; bearings for said pin in said frame and platform; a driving connection between the pin and wheel; a drive shaft mounted on the platform; a cross shaft mounted on the platform; a driving connection between the cross shaft and pin; adjacent gears of different diameters mounted on the cross shaft; adjacent gears of different diameters mounted on the drum shaft, one pair of said adjacent gears being free to rotate on the shaft on which it is mounted and each gear having clutch faces thereon; and a clutch member slidingly and detachably mounted on the same shaft, one end of the clutch member being adapted to engage the clutch face of one gear and the other end of the clutch member being adapted to engage the clutch face of the other gear, one of the gears having a clutch face having an extended hub on which the other of said gears having a clutch face is journaled.

In testimony whereof I have hereunto set my hand.

EDWIN J. ARMSTRONG.